(12) United States Patent
Huang

(10) Patent No.: US 11,027,615 B2
(45) Date of Patent: Jun. 8, 2021

(54) SYSTEM AND METHOD FOR IMPROVING TRAVEL ACROSS JOINTS IN A TRACK FOR A LINEAR MOTION SYSTEM

(71) Applicant: Rockwell Automation Technologies, Inc., Mayfield Heights, OH (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 377 days.

(21) Appl. No.: 16/203,922

(22) Filed: Nov. 29, 2018

(65) Prior Publication Data

US 2020/0171958 A1 Jun. 4, 2020

(51) Int. Cl.
*B60L 13/10* (2006.01)
*B60L 15/00* (2006.01)

(52) U.S. Cl.
CPC ............ *B60L 13/10* (2013.01); *B60L 15/005* (2013.01); *B60L 2200/26* (2013.01)

(58) Field of Classification Search
CPC ......... B60L 13/00; B60L 13/10; B60L 15/00; B60L 15/002; B60L 15/005
See application file for complete search history.

(56) References Cited

U.S. PATENT DOCUMENTS

| 7,448,327 | B2 * | 11/2008 | Thornton | B60L 13/06 104/282 |
| 8,863,669 | B2 * | 10/2014 | Young | H02P 6/006 104/292 |
| 9,346,371 | B2 * | 5/2016 | King | B65G 19/02 |
| 10,432,117 | B1 * | 10/2019 | Huang | B65G 23/00 |
| 2008/0006172 | A1 * | 1/2008 | Thornton | B60L 13/03 104/292 |
| 2015/0360581 | A1 * | 12/2015 | King | B60L 15/005 104/284 |
| 2019/0077608 | A1 * | 3/2019 | Huang | B65G 54/02 |
| 2019/0078950 | A1 * | 3/2019 | Huang | B60L 13/03 |
| 2019/0084781 | A1 * | 3/2019 | Huang | B60L 15/38 |
| 2020/0017308 | A1 * | 1/2020 | Huang | B60L 13/03 |
| 2020/0166389 | A1 * | 5/2020 | Huang | G01D 18/006 |
| 2020/0171953 | A1 * | 6/2020 | Huang | B60L 15/005 |
| 2020/0171958 | A1 * | 6/2020 | Huang | B60L 15/005 |

* cited by examiner

*Primary Examiner* — Jason C Smith
(74) *Attorney, Agent, or Firm* — Boyle Fredrickson, SC

(57) ABSTRACT

A system for determining the position of a mover as the mover transitions between segments along a track includes a first controller on a first track segment and a second controller on a second track segment. The first and second track segments are adjacent to each other and a junction is located between the two segments. The first and second controllers are in communication with each other and share a locally determined position value with the other controller. Each controller determines a compensated position value as a function of both a locally determined position value and the shared position value received from the other controller. Each controller utilizes the compensated value of the position value as determined on that controller to control operation of the mover while it is present on the corresponding track segment.

20 Claims, 9 Drawing Sheets

SYSTEM AND METHOD FOR IMPROVING TRAVEL ACROSS JOINTS IN A TRACK FOR A LINEAR MOTION SYSTEM

BACKGROUND INFORMATION

The present invention relates to motion control systems and, more specifically, to improved control of movers traveling between track segments in a linear drive system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

When the linear drive system is configured for distributed control, a separate controller may be provided for each track segment or for a number of track segments, where each controller is responsible to control motion of each of the movers present on the track segment or segments for which h is responsible. However, as a mover transitions from a first track segment controlled by a first controller to a second track segment controlled by a second controller, knowledge of the position of the mover is required by each controller in order to provide control of the mover. If the first controller and the second controller each determine a different position value for the mover, as control of the mover is passed from the first controller to the second controller, some error in the position information is present and some jitter, or a torque pulsation, may occur at the transition as the second controller compensates for the difference in the measured position values.

Error in the measured position may be introduced as a result of distributing detection of the position of each mover to each controller. With distributed detection of the position of the movers, each controller independently determines a value of the position for a mover when it is present on the corresponding segment. Due to the high rate of travel of each mover, the number of movers present in the system, and the number of track segments present in the system, it is typically not practical to transmit position feedback information back to a central controller to perform real-time monitoring of the position for each mover and, in turn, transmit this position information back to the controller for each track segment to control operation of the movers present on the track segment. Rather, real-time determination of the position of each mover for use in control of the mover occurs at the segment in which the mover is present. The segment controller may periodically transmit position information for each mover back to a central controller which monitors the location of the movers, however, this information is sent at a lower periodic rate than required to control operation of each mover, reducing the communication bandwidth required for position information.

Distributed determination of mover position is not, however, without its drawbacks. If two track segments are positioned adjacent to each other, the track position at the end of the first track segment ideally is equal to the track position at the start of the second track segment. A gap between the two track segments, however, introduces error in the position determination. In addition, variations in the placement of the position sensors during manufacturing of each track segment or variations in the signals output from the position sensors due to the tolerances of the sensor itself, provide an additional source of potential error in the position feedback signals between adjacent segments. Still another potential source of error arises in the control of the movers themselves. If adjacent segment controllers are executing in an asynchronous manner, the time at which each position sensor is sampled can vary, resulting in differences in the measured values of the position for one mover performed by each controller in the adjacent segments as the mover transitions between segments.

Thus, it would be desirable to provide an improved method and system for determining the position of a mover along a track with distributed position sensing as the mover transitions between segments.

It would also be desirable to provide an improved method and system for controlling operation of the mover as it transitions between track segments to reduce jitter or torque pulsations occurring during the transition.

BRIEF DESCRIPTION

The subject matter disclosed herein describes an improved method and system for determining the position of a mover along a track with distributed position sensing as the mover transitions between segments. A controller located within each track segment utilizes position sensors present on the corresponding track segment to measure a local value of the position of the mover. Controllers on adjacent track segments are in communication with each other and transmit a shared value of the position of the mover determined by one controller to the adjacent controller. This shared value of the position may be the measured, local value or a compensated value of the position. Each controller, in turn, determines a compensated position value using both the local, measured value of the position and the shared value of the position received from the adjacent controller.

Having knowledge of the position for the mover determined both locally and by the adjacent controller to which the mover is transitioning allows the local controller to determine the compensated position value. The compensated position value may be, for example, an average of the local position value and shared position value. Optionally, the local controller may monitor the position of the mover as it transitions between the two track segments and utilize a moving, weighted average of the two values. The local controller places a greater weight on the position value determined by the respective controller on which a greater portion of the mover resides. Utilizing either the average or the weighted average of the position value reduces the effects of a difference in the measured value of the position on each mover.

Each controller utilizes the compensated value of the position value as determined on that controller to control operation of the mover while it is present on the corresponding track segment. The compensated value of the position reduces or eliminates a step change in the position value as the move transitions between segments. Instead the compensated value of the position gradually transitions from the local measured value of position in the first controller to a shared value that is the same for both controllers when the mover is at the midpoint between the two track segments. The second controller assumes control of the mover with a position value at the shared value and gradually transitions to the local measured value of position in the second controller. The gradual transition between local measured values reduces jitter or torque pulsations occurring on the mover during the transition between track segments.

According to one embodiment of the invention, a system for improving motion of movers across junctions in a linear drive system is disclosed. The system includes multiple movers and a track along which the movers travel. The track includes at least a first track segment and a second track segment. The first track segment includes a first segment controller operative to control operation of each of the movers on the first track segment and at least one first position sensor operative to detect a location of each of the movers on the first track segment. The second track segment includes a second segment controller operative to control operation of each of the movers on the second track segment and at least one second position sensor operative to detect a location of each of the movers on the second track segment. The first segment controller is in communication with the second segment controller, and a junction is defined between the first track segment and the second track segment. When a first mover, selected from the plurality of movers, crosses the junction between the first track segment and the second track segment, the first segment controller is operative to determine a first measured position of the first mover with the location from the at least one first position sensor, transmit a first shared position to the second segment controller, receive a second shared position from the second segment controller, and determine a first compensated position of the first mover as a function of the first measured position and the second shared position. When the first mover crosses the junction between the first track segment and the second track segment, the second segment controller is operative to determine the second measured position of the first mover with the location from the at least one second position sensor, transmit the second shared position to the first segment controller, receive the first shared position from the first segment controller, and determine a second compensated position of the first mover as a function of the first shared position and the second measured position.

According to another embodiment of the invention, a method for improving motion of movers across junctions in a linear drive system is disclosed. A first position feedback signal is received with a first controller from a first position sensor on a first track segment. The first position feedback signal corresponds to a position of a mover traveling across a junction between the first track segment and a second track segment in the linear drive system. A first measured position of the mover is determined with the first controller as a function of the first position feedback signal. A second position feedback signal is received with a second controller from a second position sensor on the second track segment. A second measured position of the mover is determined with the second controller as a function of the second position feedback signal. The first measured position is transmitted from the first controller to the second controller, and the second measured position is transmitted from the second controller to the first controller. A first compensated position of the mover is determined with the first controller as a function of the first measured position and the second measured position, and a second compensated position of the mover is determined with the second controller as a function of the first measured position and the second measured position. Operation of the mover on the first track segment is controlled with the first controller as a function of the first compensated position, and operation of the mover is controlled on the second track segment with the second controller as a function of the second compensated position.

According to still another embodiment of the invention, a method for improving motion of movers across junctions in a linear drive system is disclosed. A first position feedback signal is received with a first controller from a first position sensor on a first track segment. The first position feedback signal corresponds to a position of a mover traveling across a junction between the first track segment and a second track segment in the linear drive system. A first measured position of the mover is determined with the first controller as a function of the first position feedback signal. A second position feedback signal is received with a second controller from a second position sensor on the second track segment. A second measured position of the mover is determined with the second controller as a function of the second position feedback signal. A first compensated position is transmitted from the first controller to the second controller, and a second compensated position is transmitted from the second controller to the first controller. The first compensated position of the mover is determined with the first controller as a function of the first measured position and the second compensated position, and the second compensated position of the mover is determined with the second controller as a function of the first compensated position and the second measured position. Operation of the mover on the first track segment is controlled with the first controller as a function of the first compensated position, and operation of the mover on the second track segment is controlled with the second controller as a function of the second compensated position.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
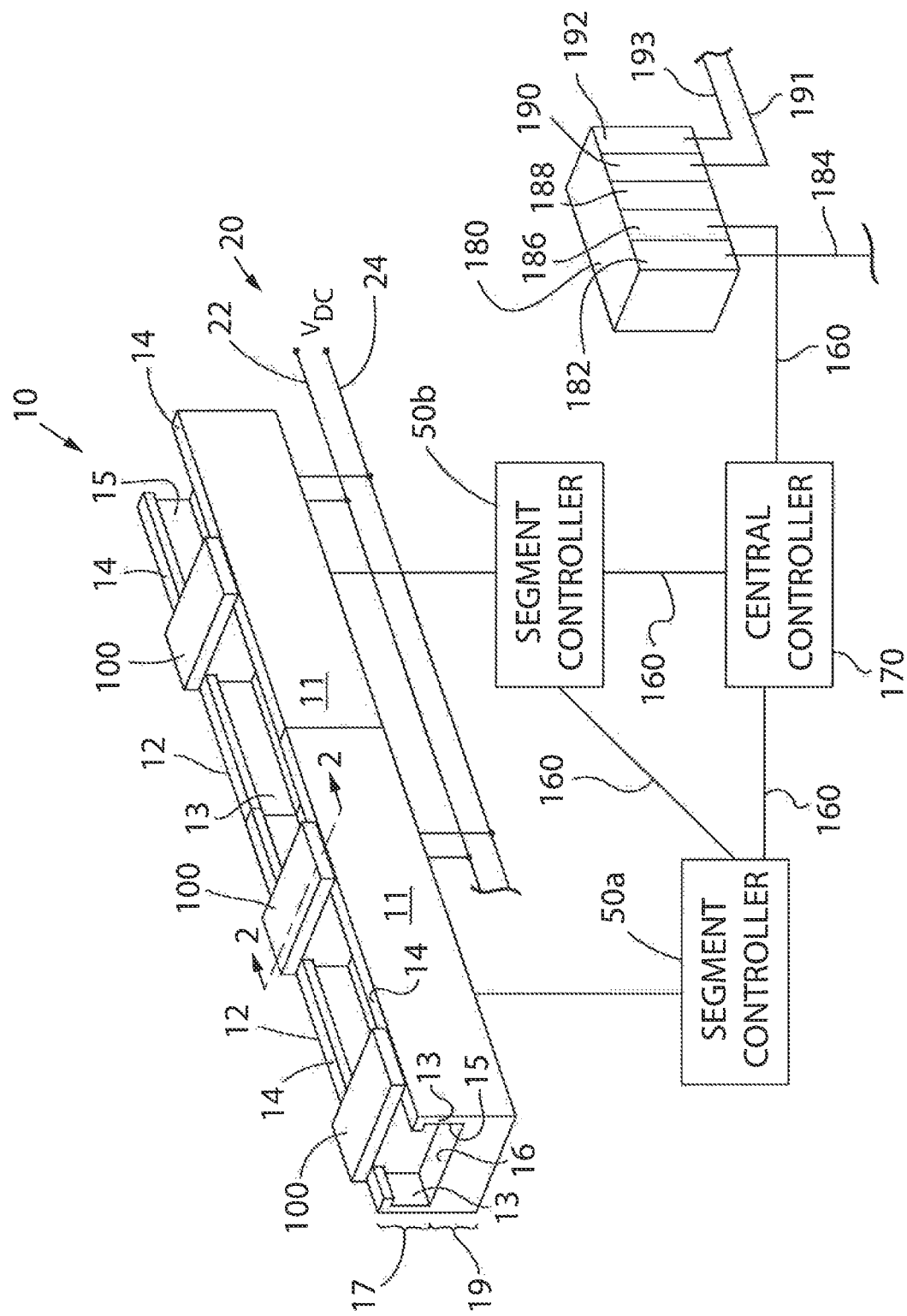
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. Track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing 11 of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

Figure 3:
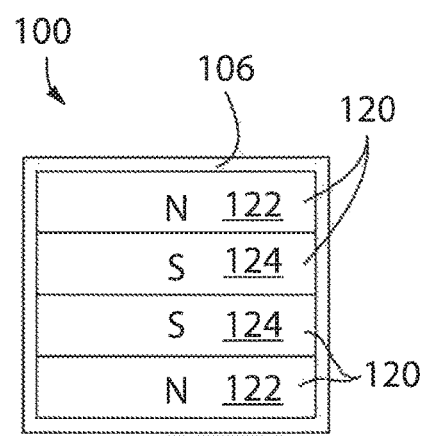
FIG. 3 is a bottom plan view of the exemplary mover of FIG. 2.
Figure 4:
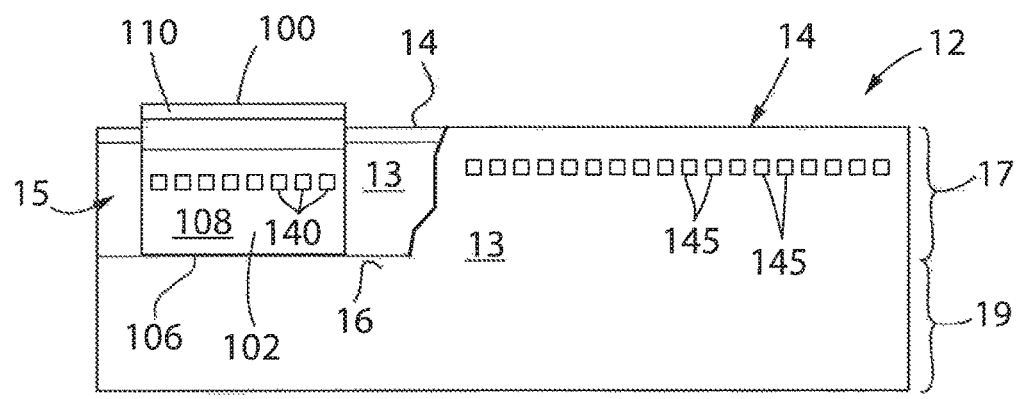
FIG. 4 is a partial side cutaway view of the mover and track segment of FIG. 2.

The mover 100 is carried along the track 10 by a linear drive system. The linear drive system is incorporated in part on each mover 100 and in part within each track segment 12. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. Various other configurations of the drive magnets 120 may be utilized without deviating from the scope of the invention.

Figure 5:
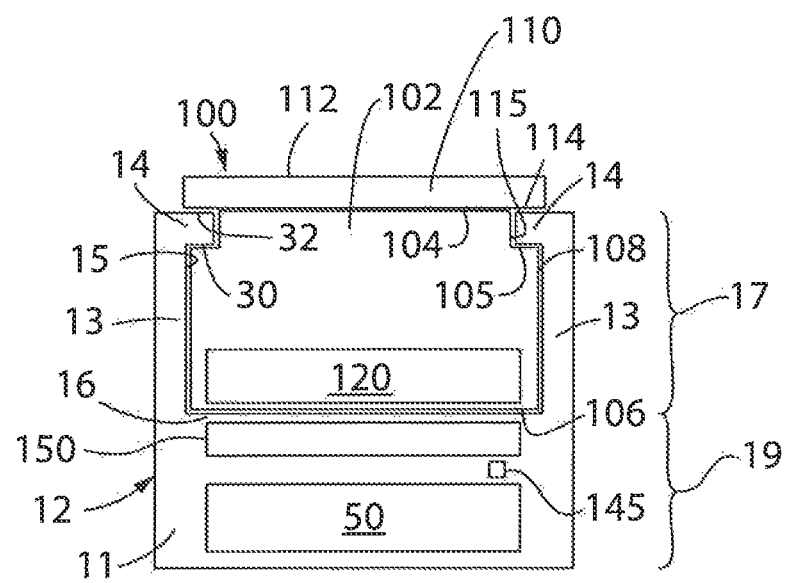
FIG. 5 is a sectional view of another embodiment of a mover and track segment included in the linear drive system taken at 2-2 of FIG. 1.
Figure 7:
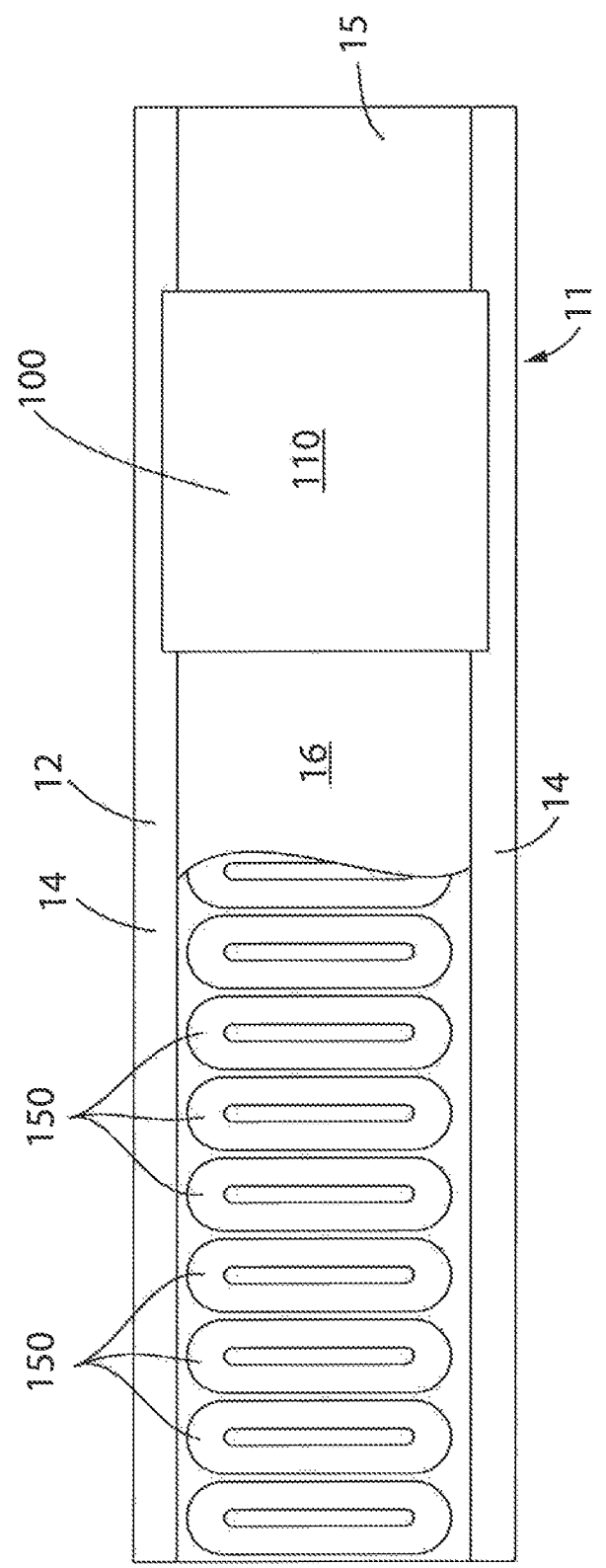
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 2:
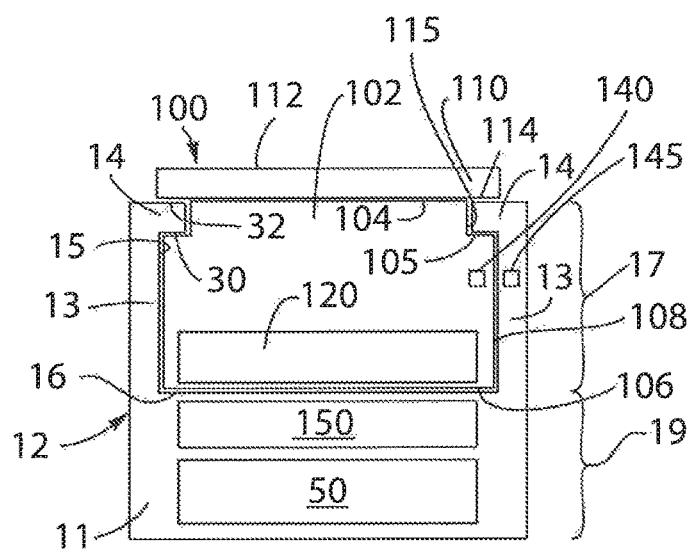
FIG. 2 is a sectional view of one embodiment of a mover and track segment included in the linear drive system taken at 2-2 of FIG. 1.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
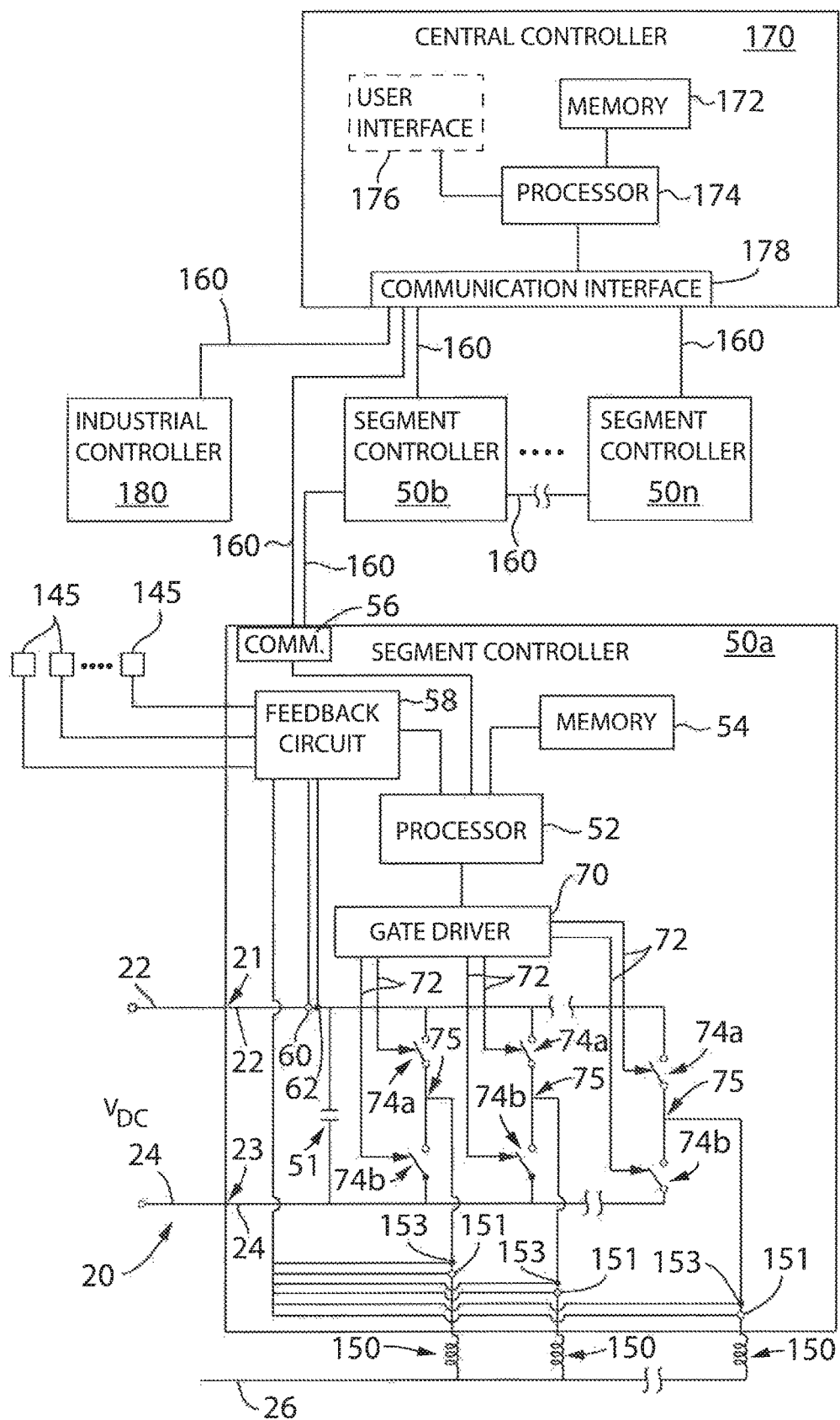
FIG. 8 is a block diagram representation of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
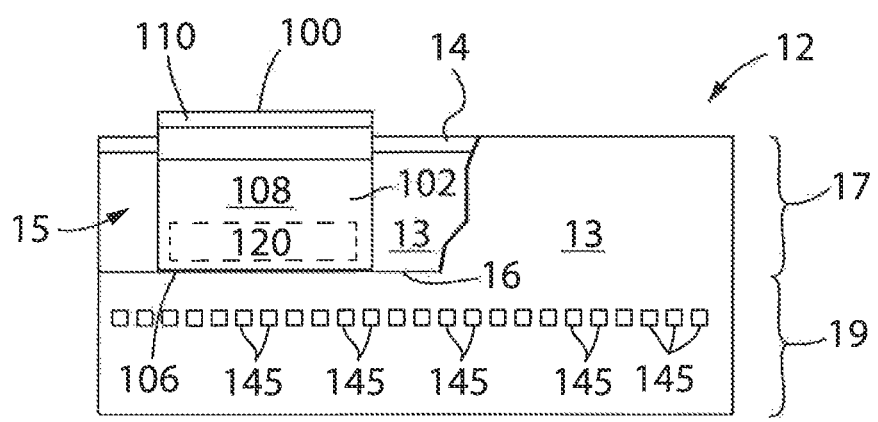
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 aid/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, $V_{DC}$, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching, device 74a and a second switching device 74b connected in series between the positive rail 22 and the negative rail 24 with a common connection 75 between the first and second switching devices 74a, 74b. The first switching device 74a in each leg 221 may also be referred to herein as an upper switch, and the second switching device 74b in each leg 221 may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

Figure 12:
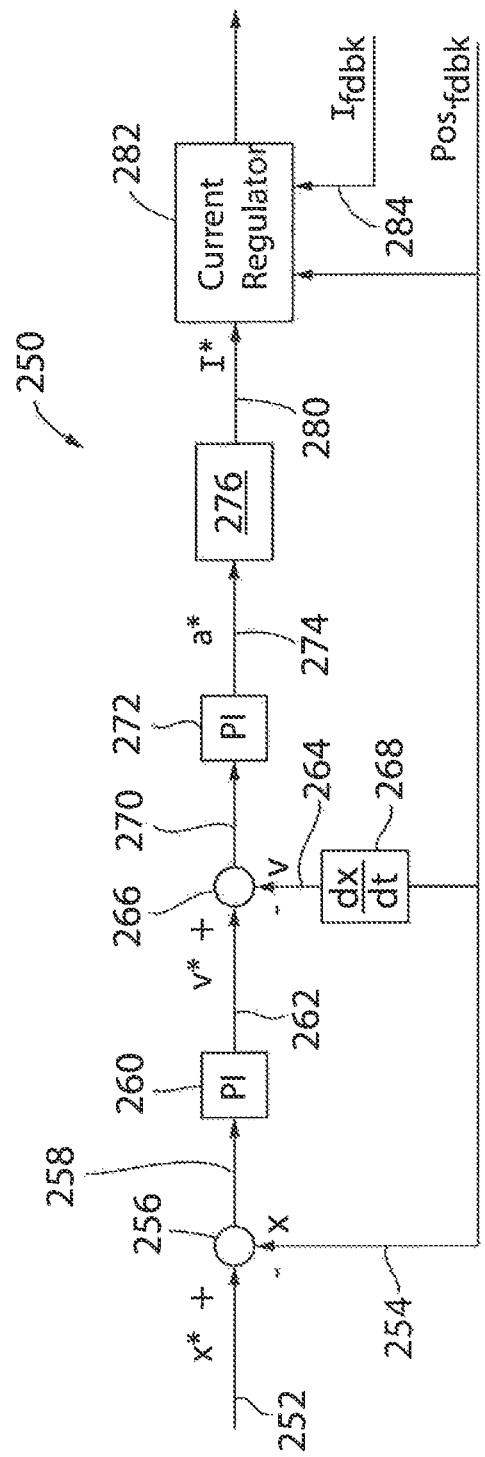
FIG. 12 is an exemplary control module included for execution on a segment controller according to one embodiment of the invention.

In operation, each track segment 12 is configured to control operation of each mover 100 present on the track segment 12. The segment controller 50 receives a command signal corresponding to the desired operation of each mover 100 and controls the current output to each coil 150 to achieve the desired operation. With reference to FIG. 12, one embodiment of a control module 250 executable by the segment controller 50 is illustrated. The control module 250 receives a position command signal (x*) 252 as an input. The position command signal (x*) is compared to a position feedback signal (x) 254 at a first summing junction 256. A position error signal 258 is output from the first summing junction 256 and input to a position loop controller 260. According to the illustrated embodiment, the position loop controller 260 includes a proportional and an integral (PI) controller. Optionally, the position loop controller 260 may be just a proportional (P) controller or further include a derivative (D) controller. Each of the proportional (P), integral (I), and/or derivative (D) controllers of the position loop controller 260 includes a controller gain value. The controller gain values are commonly referred to as a proportional gain (Kpp), integral gain (Kpi), and a derivative gain (Kpd). The output of the position loop controller 260 is a velocity reference signal (v*) 262.

The velocity reference signal (v*) 262 is compared to a velocity feedback signal (v) 264 at a second summing junction 266. The velocity feedback signal (v) 264 is generated by a derivative block 268 acting on the position feedback signal 254. A velocity error 270 signal is output from the second summing junction 266 and input to a velocity loop controller 272. According to the illustrated embodiment, the velocity loop controller 272 includes a proportional and an integral (PI) controller. Optionally, the velocity loop controller 272 may be just a proportional (P) controller or further include a derivative (D) controller. Each of the proportional (P), integral (I), and/or derivative (D) controllers of the velocity loop controller 272 includes a controller gain value. The controller gain values are commonly referred to as a proportional gain (Kvp), integral gain (Kvi), and a derivative gain (Kvd). The output of the velocity loop controller 272 is an acceleration reference signal (a*) 274.

The acceleration reference signal 274 is passed through an additional gain and filter block 276. The gain and filter block 276 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 276 may also include an inertial gain factor or a torque constant gain factor. An inertial gain factor converts the acceleration reference to a torque reference and the torque constant gain factor converts a torque reference to a current reference, I*, 280. Optionally, gain factors may be incorporated into a single gain or incorporated with filter or controller gains. Combining the inertial and/or torque constant gain factors together or with another controller gain or with the filter gain reduces the real time computational burden imposed on the segment controller 50.

The current reference, I*, 280 is, in turn, passed to a current regulator 282, which controls the current supplied to each coil 150 on the track segment. The current regulator 282 receives current feedback signals from the current sensors 151 and position feedback information identifying the measured position of each mover 100 or a compensated position of each mover, as will be discussed in more detail below. Because a mover 100 may span multiple coils 150, the current regulator 282 determines an appropriate current for each coil 150 to produce the force desired to control the mover as indicated by the current reference, I*, 280 and determines a resultant current desired for each coil 150. The current regulator 282 uses the current and position feedback information to regulate the current to each coil 150, accordingly.

The output of the current regulator 282 is provided as an input to the gate driver module 70. With reference again to FIG. 8, the gate driver module 70 converts the input to a desired output voltage having a variable amplitude and frequency. Having determined the desired output voltage required to produce the commanded input, the gate driver module 70 generates the gating signals 72 used by pulse width modulation (PWM) or by other modulation techniques to control the switching elements 74a, 74b to produce the desired currents in each coil 150, resulting in the desired motion for each mover 100.

As illustrated in FIG. 12 and as discussed above, the control module 250 utilizes position feedback information to regulate the current output to each coil 150. If the position feedback information has some error, the current output to each coil 150 will similarly include some error, resulting in undesired operation of the mover 100.

Figure 9:
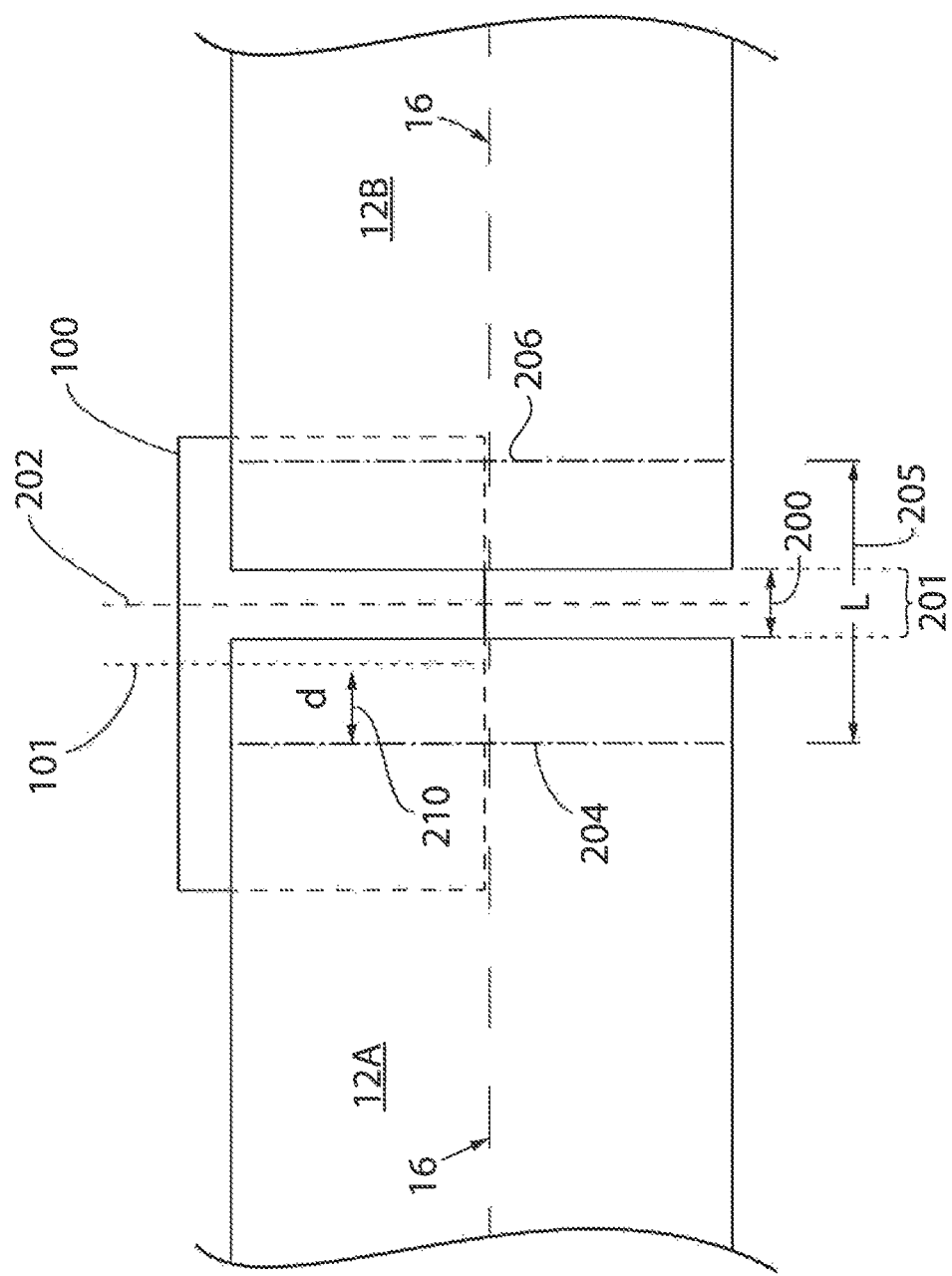
FIG. 9 is partial side elevation view of a mover crossing a junction between track segments.
Figure 10:
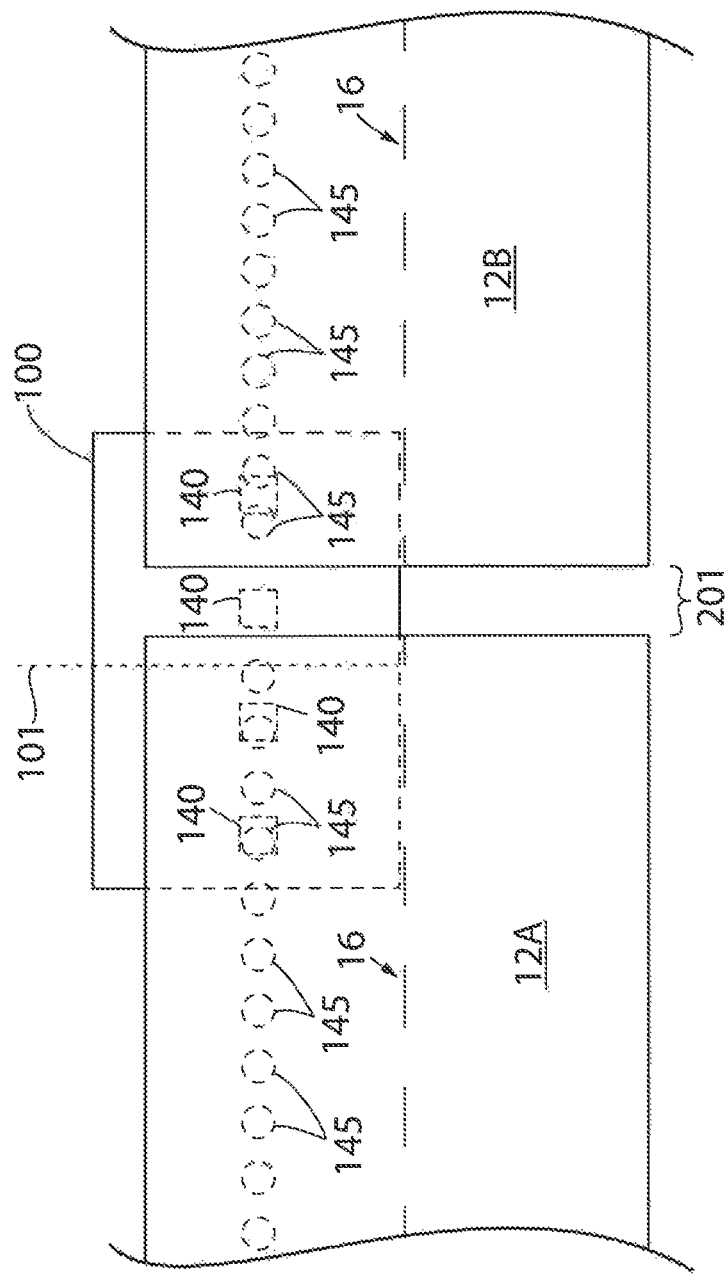
FIG. 10 is a partial side elevation view of a mover crossing the junction between track segments further illustrating one embodiment of a position feedback system.

Turning next to FIGS. 9 and 10, one potential source of position error is a gap 200 being present at a junction 201 between two track segments 12. According to one embodiment of the invention, each track segment 12 is one meter (1 m) in length. As a mover 100 travels along the track, each track segment 12 is defined within the central controller as having a position that corresponds to the one meter length. For example, a first track segment 12 is assigned the position from zero to one meter. A second track segment 12 is assigned the position from one meter to two meters. A third track segment 12 is assigned the position from two meters to three meters and so on. Ideally, a second end of the leading track segment is positioned tightly against a first end of the following track segment to provide a smooth transition between track segments. However, during installation or as a result of machining tolerances for the end of either track segment, a gap 200 may exist between the two track segments. The gap may be, for example, only one millimeter or may vary from several millimeters up to tens of millimeters. The gap causes variations in position feedback detection between track segments 12.

Motion of a mover 100 as it crosses a junction 201 with a gap 200 will be discussed with respect to an exemplary mover 100 and track segments 12A, 12B illustrated in FIGS. 11A-11C. It will be assumed that the first track segment 12A is assigned a location along the track 10 of one meter to two meters (1-2 m) and the second track segment 12B assigned a location along the track 10 of two meters to three meters (2-3 m). A five millimeter (5 mm) gap 200 exists at the junction 201 between the two track segments.

Figure 11A:
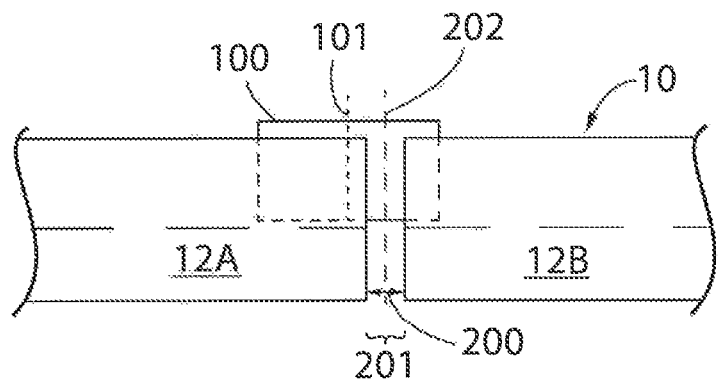
FIG. 11A is a partial side elevation view of a mover crossing the junction between track segments with the mover on the first track segment.
Figure 11B:
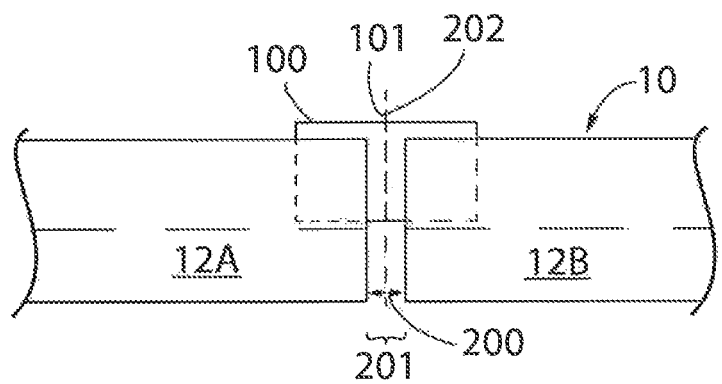
FIG. 11B is a partial side elevation view of the mover of FIG. 11A crossing the junction between track segments with the mover located evenly between the two track segments.
Figure 11C:
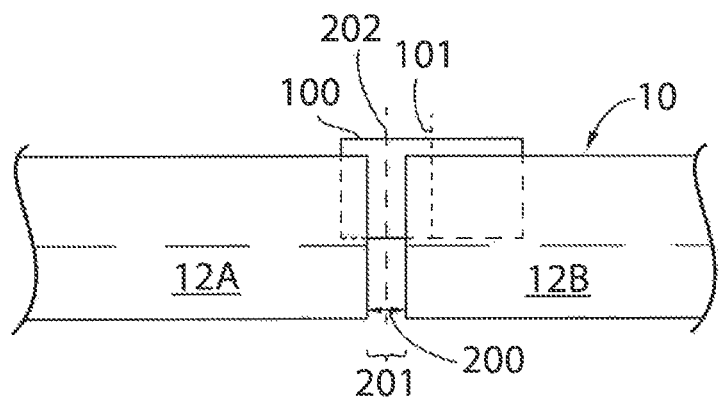
FIG. 11C is a partial side elevation view of the mover of FIG. 11A crossing the junction between track segments with the mover on the second track segment.

A center axis 101 of the mover 100 and a center line 202 of the junction 201 are each illustrated in FIGS. 11A-11C. As the mover 100 travels from the first segment 12A to the second segment 12B, the center axis 101 of the mover is initially located over the first segment 12A while a forward edge of the mover 100 crosses the junction 201 and is located on the second segment 12B, as shown in FIG. 11A. At the midpoint in the crossing, as shown in FIG. 11B, the center axis 101 of the mover is aligned with the center line 202 of the junction 201 between the two segments 12A, 12B, and an equal portion of the mover 100 is located on each segment. As the mover 100 continues across the junction 201, the center axis 101 and a greater portion of the mover 100 is present on the second segment 12B and the trailing edge of the mover 100 remains of the first segment 12A. Eventually, the mover 100 continues moving until the entire mover 100 is located over the second segment 12B.

As a mover 100 approaches the junction 201, the segment controller 50 on the first track segment 12A initially controls current output to each coil 150 on the first track segment to control motion of the mover 100. The first segment 12A remains responsible for control of the mover 100 until the mover reaches the middle point shown in FIG. 12B. As the center axis 101 of the mover 100 crosses the center line 202 of the junction 201, control of the mover 100 is passed from the segment controller 50 in the first segment 12A to the segment controller 50 in the second segment 12B.

In order for control of the mover 100 to transition between segments, both segments 12A, 12B must have knowledge of the position of the mover 100. As illustrated in FIG. 10, the mover 100 includes an array of position magnets 140 spaced along the length of the mover 100. The center axis 101 of the mover 100 is positioned over the first segment 12A and, therefore, the segment controller in the first segment 12A is responsible for control of the mover. A first portion of the position magnets 140 in the magnet array are located over the first segment 12A and a second portion of the position magnets 140 in the magnet array are located over the second segment 12B. The position sensors 145, spaced along the length of both segments are able to detect the position magnets 140 located over the respective segment. The segment controller 50 in both segments receives position feedback signals from those position sensors 145 that are able to detect one of the position magnets 140 and generates a value for the position of the mover 100 responsive to those position feedback signals.

If, for example, the center axis 101 of the mover is aligned with the end of the first segment 12A at the start of the gap 200, the segment controller 50 in the first segment 12A will identify this position as corresponding to two meters along the track. The first segment controller 50 is aware that it is defined as being between one and two meters along the length of the track 10 and it identifies the center axis 101 of the mover 100 (to which the position of the mover is assigned) as being at the edge of the first segment 12A. The segment controller 50 in the second segment 12B, however, identifies this position as corresponding to two meters (2 m) minus the five millimeter (5 mm) gap, or one meter nine hundred ninety five millimeters (1.995 m). The second segment 12B identifies its leading edge as also corresponding to two meters, but determines that the position of the mover 100 is five millimeters away from the front edge. This five millimeter difference in position detection would be continuous throughout the transition across the junction as each segment controller 50 is only aware of its assigned position along the track and determines a position of each mover 100 with respect to the boundaries of its corresponding track segment.

Thus, without taking any steps to smooth the transition, when control of the mover 100 transitions between the segment controllers, there is a step change in the position of the mover 100 observed by the segment controllers in each track segment 12 which results in a disturbance in the control module 250 executing on the segment controller 50 in the second segment 12B and which, in turn, creates a disturbance on the current output to the coils 150 as the control module 250 regulates the position of the mover 100 to coincide with the position observed on the second segment 12B.

The example presented above assumes ideal position sensors 145 and ideal installation of the position sensors. As previously discussed, variations in the sensors 145 will result in position feedback signals having different magnitudes and/or offset values in the feedback signal. The segment controller interprets a particular magnitude of the feedback signal as corresponding to a particular distance that the position magnet 140 is located from the sensor 145. Variations in the feedback signals from each sensor 145 will result in some position error as a result of the sensor readings. Similarly, variations in the installation of the sensors 145 will also generate error. The segment controller 50 assigns a particular location to each sensor 145 along the length of the track segment. Error in mounting the sensor 145 will also generate an offset from the expected location which appears as an error to the segment controller in determining the location of the mover 100 along the track segment 12. Combinations of the various sources of error are likely to introduce differences in determination of the location of the mover 100 between adjacent segments 12 as the mover transitions between the segments and, therefore, result in the undesirable disturbance on the current output to the coils 150 as control of the mover 100 is passed between the adjacent segments.

The present invention provides for an improved transition of control between segment controllers 50 as control of a mover 100 is passed between segment controllers 50. As the mover 100 crosses the junction 201 between track segments 12A, 12B, a first segment controller 50 in the first segment 12A reads the feedback signals from position sensors 145 detecting position magnets 140 located on the mover 100 within range of the first segment side of the junction 201 and a second segment controller 50 in the second segment 12B reads the feedback signals from position sensors 145 detecting position magnets 140 located on the mover 100 within range of the second segment side of the junction 201. The first segment controller determines a first measured position and the second segment controller determines a second measured position as a function of the feedback signals received at each of the respective controllers.

Each of the first and second segment controllers 50 are in communication with each other. With reference, for example, to FIG. 1, a suitable network medium 160 extends between each segment controller and message packets may be transmitted according to the network protocol. Optionally, it is contemplated that a dedicated communication bus may extend between segment controllers 50 in adjacent track segments, where complementary connectors may be provided on each end of a track segment and joined together during assembly of the track 10.

According to one embodiment of the invention, each segment controller 50 communicates the measured position determined on that segment controller to the adjacent segment controller. With reference also to FIG. 9, a compensation region 205 is defined that spans at least a portion of each of the first and second track segments 12A, 12B. The compensation region 205 includes a leading edge 204, which serves as a starting point for the compensation region, and a trailing edge 206, which serves as an ending point for the compensation region, where the leading edge and trailing edge are defined according to the direction of travel of a mover 100 along the track 10 and has a width, L, across the junction 201. While the center axis 101 of the mover 100 is within this compensation region 205, both segment controllers 50 utilize a combination of the measured position determined within the respective controller and the shared position received from the other controller to determine a compensated position value. The segment controller 50, in turn, uses the compensated position value in the current regulator 282 rather than the measured value to control the current supplied to each coil 150 in the corresponding segment 12.

According to one aspect of the invention, it is contemplated that each segment controller 50 uses an average of the measured position value and of the shared position value received from the other segment controller as shown below in Eq. 1, Using an average of the two position values determined by each controller will, at a minimum, divide any torque pulsation, or jitter, generated by different position values to occur in part at the leading edge 204 of the compensation region 205 when the segment controller 50 in the first segment 12A begins using the average value and in part at the trailing edge 206 of the compensation region 205 when the segment controller 50 in the second segment 12B stops using the average value.

$$x_1, x_2 = \frac{m_1 + m_2}{2} \tag{1}$$

where:
$x_1$=the compensated position determined by the first segment controller,
$x_2$=the compensated position determined by the second segment controller,
$m_1$=the measured position determined by the first segment controller, and
$m_2$=the measured position determined by the second segment controller.

According to another aspect of the invention, it is contemplated that each segment controller 50 uses a weighted average value of the measured position value and the shared position value received from the other segment controller. The weighted average may provide more weight to the measured position determined by the first segment controller, $m_1$, when the center axis 101 of the mover 100 is in front of the center line 202 of the junction 201 and may provide more weight to the measured position determined by the second segment controller, $m_2$, when the center axis 101 of the mover 100 is past the center line 202 of the junction 201. With reference to FIG. 9, a center-line distance, d, 210 is defined as a distance from the leading edge 204 of the compensation region 205 to the center axis 101 of the mover 100. Each of the segment controllers 50 determines a compensated position value as a function of the measured position from each of the controllers as shown below in Eq. 2. The weighted average, presented below, smooths the transition between the two measured position values across the entire width, L, of the compensation region 205.

$$x_1, x_2 = \frac{L-d}{L} \cdot m_1 + \frac{d}{L} \cdot m_2 \tag{2}$$

where:
$x_1$=the first compensated position,
$x_2$=the second compensated position,
$m_1$=the first measured position,
$m_2$=the second measured position,
L=a width of the compensation region, and
d=the center-line distance.

According to another embodiment of the invention, it may be desirable for each segment controller 50 to communicate the compensated position determined on that segment controller to the adjacent segment controller. The segment controller 50 in the adjacent track segment 12 may utilize the compensated position value to smooth operation of the mover 100 over the junction 201. Utilizing the compensated position value received from the adjacent controller to determine an average value within each segment controller may be done as shown in Eqs. 3 and 4.

$$x_1 = \frac{m_1 + x_2}{2} \tag{3}$$

$$x_2 = \frac{x_1 + m_2}{2} \tag{4}$$

where:
$x_1$=the compensated position determined by the first segment controller, $x_2$=the compensated position determined by the second segment controller,
$m_1$=the measured position determined by the first segment controller, and
$m_2$=the measured position determined by the second segment controller.

In a similar manner, the compensated position value received from the adjacent controller may be utilized by each segment controller 50 to determine weighted averages as shown below in Eqs. 5 and 6.

$$x_1 = \frac{L-d}{L} \cdot m_1 + \frac{d}{L} \cdot x_2 \qquad (5)$$

$$x_2 = \frac{L-d}{L} \cdot x_1 + \frac{d}{L} \cdot m_2 \qquad (6)$$

where:
$x_1$=the first compensated position,
$x_2$=the second compensated position,
$m_1$=the first measured position,
$m_2$=the second measured position,
L=a width of the compensation region, and
d=the center-line distance.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for improving motion of movers across junctions in a linear drive system, the system comprising:
   a plurality of movers; and
   a track along which the plurality of movers travel, the track including at least a first track segment and a second track segment, wherein:
   the first track segment includes:
      a first segment controller operative to control operation of each of the plurality of movers on the first track segment, and
      at least one first position sensor operative to detect a location of each of the plurality of movers on the first track segment;
   the second track segment includes:
      a second segment controller operative to control operation of each of the plurality of movers on the second track segment, and
      at least one second position sensor operative to detect a location of each of the plurality of movers on the second track segment;
   the first segment controller is in communication with the second segment controller;
   a junction is defined between the first track segment and the second track segment; and
   when a first mover, selected from the plurality of movers, crosses the junction between the first track segment and the second track segment, the first segment controller is operative to determine a first measured position of the first mover with the location from the at least one first position sensor, transmit a first shared position to the second segment controller, receive a second shared position from the second segment controller, and determine a first compensated position of the first mover as a function of the first measured position and the second shared position and the second segment controller is operative to determine a second measured position of the first mover with the location from the at least one second position sensor, transmit the second shared position to the first segment controller, receive the first shared position from the first segment controller, and determine a second compensated position of the first mover as a function of the first shared position and the second measured position.

2. The system of claim 1 wherein the first shared position is the first measured position and the second shared position is the second measured position.

3. The system of claim 2 wherein the first compensated position and the second compensated position are each equal to an average of the first measured position and the second measured position.

4. The system of claim 2 wherein:
   the first track segment includes a first end and a second end,
   the second track segment includes a first end and a second end,
   the second end of the first track segment is adjacent to the first end of the second track segment and the junction is located between the second end of the first track segment and the first end of the second track segment, and
   a compensation region spans the junction and includes a starting point and an ending point, wherein the starting point is spaced inward along the first track segment from the second end of the first track segment and the ending point is spaced inward along the second track segment from the first end of the second track segment.

5. The system of claim 4 wherein:
   at least one of the first segment controller and the second segment controller is operative to determine a center-line distance of the mover,
   the center-line distance is equal to a distance between a center axis of the mover and the starting point of the compensation region, and
   the first compensated position and the second compensated position are determined as a function of the first measured position, the second measured position, a width of the compensation region, and the center-line distance.

6. The system of claim 1 wherein the first shared position is the first compensated position and the second shared position is the second compensated position.

7. The system of claim 6 wherein the first compensated position is an average of the first measured position and the second compensated position and the second compensated position is an average of the first compensated position and the second measured position.

8. The system of claim 6 wherein:
   the first track segment includes a first end and a second end,
   the second track segment includes a first end and a second end,
   the second end of the first track segment is adjacent to the first end of the second track segment and the junction is located between the second end of the first track segment and the first end of the second track segment, and a compensation region spans the junction and includes a starting point and an ending point, wherein the starting point is spaced inward along the first track segment from the second end of the first track segment and the ending point is spaced inward along the second track segment from the first end of the second track segment.

9. The system of claim 8 wherein:
at least one of the first segment controller and the second segment controller is operative to determine a center-line distance of the mover,
the center-line distance is equal to a distance between a center axis of the mover and the starting point of the compensation region,
the first compensated position is determined as a function of the first measured position, the second compensated position, a width of the compensation region, and the center-line distance, and
the second compensated position is determined as a function of the first compensated position, the second measured position, the width of the compensation region, and the center-line distance.

10. The system of claim 1 wherein:
the at least one first position sensor and the at least one second position sensor are each a magnetic field detector,
each of the plurality of movers includes an array of magnets spaced along a length of the mover, wherein at least one first magnet from the array of magnets is present on the first segment and at least one second magnet from the array of magnets is present on the second segment as the first mover crosses the junction,
the at least one first position sensor detects the location of the first mover by generating a signal corresponding to a distance that the at least one first magnet is away from the at least one first position sensor, and
the at least one second position sensor detects the location of the first mover by generating a signal corresponding to a distance that the at least one second magnet is away from the at least one second position sensor.

11. A method for improving motion of movers across junctions in a linear drive system, the method comprising the steps of:
receiving a first position feedback signal with a first controller from a first position sensor on a first track segment, wherein the first position feedback signal corresponds to a position of a mover traveling across a junction between the first track segment and a second track segment in the linear drive system;
determining a first measured position of the mover with the first controller as a function of the first position feedback signal;
receiving a second position feedback signal with a second controller from a second position sensor on the second track segment;
determining a second measured position of the mover with the second controller as a function of the second position feedback signal;
transmitting the first measured position from the first controller to the second controller;
transmitting the second measured position from the second controller to the first controller;
determining a first compensated position of the mover with the first controller as a function of the first measured position and the second measured position;
determining a second compensated position of the mover with the second controller as a function of the first measured position and the second measured position;
controlling operation of the mover on the first track segment with the first controller as a function of the first compensated position; and
controlling operation of the mover on the second track segment with the second controller as a function of the second compensated position.

12. The method of claim 11 wherein the first compensated position and the second compensated position are each equal to an average of the first measured position and the second measured position.

13. The method of claim 11 wherein:
the first track segment includes a first end and a second end,
the second track segment includes a first end and a second end,
the second end of the first track segment is adjacent to the first end of the second track segment and the junction is located between the second end of the first track segment and the first end of the second track segment, and
a compensation region spans the junction and includes a starting point and an ending point, wherein the starting point is spaced inward along the first track segment from the second end of the first track segment and the ending point is spaced inward along the second track segment from the first end of the second track segment.

14. The method of claim 13 wherein:
at least one of the first controller and the second controller is operative to determine a center-line distance of the mover,
the center-line distance is equal to a distance between a center axis of the mover and the starting point of the compensation region, and
the first compensated position and the second compensated position are determined as a function of the first measured position, the second measured position, a width of the compensation region, and the center-line distance.

15. The method of claim 14 wherein the first compensated position and the second compensated position are determined by the following equation:

$$x_1, x_2 = \frac{L-d}{L} \cdot m_1 + \frac{d}{L} \cdot m_2$$

where:
$x_1$=the first compensated position,
$x_2$=the second compensated position,
$m_1$=the first measured position,
$m_2$=the second measured position,
L=a width of the compensation region, and
d=the center-line distance.

16. A method for improving motion of movers across junctions in a linear drive system, the method comprising the steps of:
receiving a first position feedback signal with a first controller from a first position sensor on a first track segment, wherein the first position feedback signal corresponds to a position of a mover traveling across a junction between the first track segment and a second track segment in the linear drive system;

determining a first measured position of the mover with the first controller as a function of the first position feedback signal;
receiving a second position feedback signal with a second controller from a second position sensor on the second track segment;
determining a second measured position of the mover with the second controller as a function of the second position feedback signal;
transmitting a first compensated position from the first controller to the second controller;
transmitting a second compensated position from the second controller to the first controller;
determining the first compensated position of the mover with the first controller as a function of the first measured position and the second compensated position;
determining the second compensated position of the mover with the second controller as a function of the first compensated position and the second measured position;
controlling operation of the mover on the first track segment with the first controller as a function of the first compensated position; and
controlling operation of the mover on the second track segment with the second controller as a function of the second compensated position.

17. The method of claim 16 wherein the first compensated position is an average of the first measured position and the second compensated position and the second compensated position is an average of the first compensated position and the second measured position.

18. The method of claim 16 wherein:
the first track segment includes a first end and a second end,
the second track segment includes a first end and a second end,
the second end of the first track segment is adjacent to the first end of the second track segment and the junction is located between the second end of the first track segment and the first end of the second track segment, and
a compensation region spans the junction and includes a starting point and an ending point, wherein the starting point is spaced inward along the first track segment from the second end of the first track segment and the ending point is spaced inward along the second track segment from the first end of the second track segment.

19. The method of claim 18 wherein:
at least one of the first controller and the second controller is operative to determine a center-line distance of the mover,
the center-line distance is equal to a distance between a center axis of the mover and the starting point of the compensation region,
the first compensated position is determined as a function of the first measured position, the second compensated position, a width of the compensation region, and the center-line distance, and
the second compensated position is determined as a function of the first compensated position, the second measured position, the width of the compensation region, and the center-line distance.

20. The method of claim 19 wherein the first compensated position and the second compensated position are determined by the following equations:

$$x_1 = \frac{L-d}{L} \cdot m_1 + \frac{d}{L} \cdot x_2$$

$$x_2 = \frac{L-d}{L} \cdot x_1 + \frac{d}{L} \cdot m_2$$

where:
$x_1$=the first compensated position,
$x_2$=the second compensated position,
$m_1$=the first measured position,
$m_2$=the second measured position,
L=a width of the compensation region, and
d=the center-line distance.

* * * * *